United States Patent
Shin et al.

(10) Patent No.: US 8,437,318 B2
(45) Date of Patent: May 7, 2013

(54) RELIABLE AND LOW-LATENCY SENSOR NETWORK MAC SYSTEM AND METHOD USING SUPERFRAME

(75) Inventors: Chang-Sub Shin, Daejeon (KR); Jung-Sook Kim, Seoul (KR); Jae-Han Lim, Daejeon (KR); Kyung-Bok Sung, Daejeon (KR); Kyeong-Tae Kim, Daejeon (KR); Byung-Tae Jang, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 351 days.

(21) Appl. No.: 12/809,001

(22) PCT Filed: Jun. 26, 2008

(86) PCT No.: PCT/KR2008/003689
§ 371 (c)(1), (2), (4) Date: Jun. 17, 2010

(87) PCT Pub. No.: WO2009/078519
PCT Pub. Date: Jun. 25, 2009

(65) Prior Publication Data
US 2011/0158204 A1    Jun. 30, 2011

(30) Foreign Application Priority Data
Dec. 17, 2007 (KR) .......................... 10-2007-0132595

(51) Int. Cl.
*H04J 3/00* (2006.01)

(52) U.S. Cl.
USPC ......................................................... 370/336

(58) Field of Classification Search .................. None
See application file for complete search history.

(56) References Cited

U.S. PATENT DOCUMENTS

| 2007/0047510 | A1* | 3/2007 | Cho et al. ........................ 370/338 |
| 2008/0165709 | A1* | 7/2008 | Soliman ........................... 370/280 |
| 2008/0247366 | A1* | 10/2008 | Celentano et al. ............. 370/338 |
| 2009/0067389 | A1* | 3/2009 | Lee et al. ....................... 370/336 |
| 2010/0067428 | A1* | 3/2010 | Cordeiro et al. ............... 370/315 |

FOREIGN PATENT DOCUMENTS

KR    1020070005515    1/2007
(Continued)

OTHER PUBLICATIONS

Ko, Li-chun et al., "Design and Implementation of IEEE 802.15.4 Beacon-enabled Network Devices," Proceedings of the Fourth Annual IEEE International Conference on Pervasive Computing and Communications Workshops (PERCOMW'06), pp. 1-5 (2006).

*Primary Examiner* — John Blanton
(74) *Attorney, Agent, or Firm* — Nelson Mullins Riley & Scarborough LLP; EuiHoon Lee, Esq.

(57) ABSTRACT

Provided are a reliability-based, real-time sensor network medium access control (MAC) communication system and method using a superframe. The superframe includes an active duration which is a time duration in which a communication is established, and a sleep duration which is a time duration in which no communication is established. The active duration includes a beacon block in which a plurality of beacon transmission nodes are respectively allocated beacon slots for transmitting a beacon frame, and a forwarding block in which each of sinks nodes is allocated a slot for unifying data regarding the sink node and data regarding sensor nodes managed by the sink node and transmit the result of unifying in order to establish a communication between the sink nodes and between each of the sink nodes and a base station.

7 Claims, 7 Drawing Sheets

FOREIGN PATENT DOCUMENTS

| | | |
|---|---|---|
| KR | 1020070053087 | 5/2007 |
| KR | 1020070107561 | 11/2007 |
| WO | 2007/004854 A1 | 1/2007 |
| WO | 2007/126238 A1 | 11/2007 |

\* cited by examiner

| OCTETS: 2 | 2 | VARIABLE | 3 | VARIABLE (7) | VARIABLE | VARIABLE | VARIABLE | 2 |
|---|---|---|---|---|---|---|---|---|
| FRAME CONTROL | SEQUENCE NUMBER | ADDRESS FIELD | SUPERFRAME STRUCTURE INFO (421) | SUPERFRAME ALLOCATION INFO (422) | SLOT ALLOCATION INFO (423) | PENDING ADDRESS FIELDS (424) | BEACON PAYLOAD (425) | FCS |
| MAC HEADER (410) | | | BEACON PAYLOAD (420) | | | | | MFR (430) |

FIG. 5

| BITS: 0-7 | 8-15 | 16 | 17-23 |
|---|---|---|---|
| NUMSUPER-FRAMESLOT | NUMEXTENTION BEACON | ASSOCIATION PERMIT | RESERVED |

510 — BITS: 0-7
520 — 8-15

RELIABLE AND LOW-LATENCY SENSOR NETWORK MAC SYSTEM AND METHOD USING SUPERFRAME

RELATED APPLICATIONS

This application is a 35 U.S.C. 0371 national stage filing PCT Application No. PCT/KR2008/003689 filed on Jun. 26, 2008, which claims priority to, and the benefit of, Korean Patent Application No. 10-2007-0312595 filed Dec. 17, 2007. The contents of the aforementioned applications are hereby incorporated by reference.

TECHNICAL FIELD

The present invention relates to a sensor network medium access control (MAC) communication system for a telematics service required to be performed in real time and very reliably.

The present invention is derived from a research project supported by the Information Technology (IT) Research & Development (R&D) program of the Ministry of Information and Communication (MIC) and the Institute for Information Technology Advancement (IITA) [2006-S-024-02, Development of USN Infra-Based Telematics Application Service Technique].

BACKGROUND ART

Various medium access control (MAC) techniques for a sensor network have been developed according to service requirements. In particular, the IEEE802.15.4 MAC/PHY standards have substantially, widely been used as international standards. The IEEE802.15.4 MAC/PHY standards have an advantage of being easily developed and installed since they can reduce power consumption and have a simple construction. As representative examples, there are a contention-based MAC method based on a carrier sense multiple access/collision avoidance (CSMA-CA) method, and a restrictive GTS (Guaranteed Time Slot) method (a kind of TDMA) that is an optional technique.

A GTS mode defined in the IEEE802.15.4 MAC standards may be used as a sensor network MAC technique for realizing a telematics service in real time and with high reliability. However, in the GTS mode, it is difficult to collect and process data in real time and within a limited amount of time since the total number of GTS slots is limited to seven and only a PAN(Personal area network) coordinator can allocate GTS slots.

DISCLOSURE OF INVENTION

Technical Problem

Also, if there are a large number of sensor nodes for collecting information, multi-hop data transmission is required in order to transmit data to a destination. In this case, a conventional sensor network MAC scheme causes a serious delay and data loss, thereby degrading the overall system performance.

Therefore, there is a need for development of a sensor network MAC communication system capable of performing multi-hop data transmission at a system level in real time and with high reliability while reducing power consumption.

Advantageous Effects

According to the above embodiments of the present invention, by using a scalable and flexible superframe construction, it is possible to provide a service in real-time and with high reliability while reducing power consumption. Also, the present invention provides a multi-hop based TDMA method enabling system optimization using a system construction parameter.

DESCRIPTION OF DRAWINGS

The above and other features and advantages of the present invention will become more apparent by describing in detail exemplary embodiments thereof with reference to the attached drawings in which.

BEST MODE

The present invention provides a medium access control (MAC) communication system and method using a scalable superframe construction.

According to an aspect of the present invention, there is provided a reliability-based, real-time sensor network multiple access channel (MAC) communication system using a superframe. The superframe includes an active duration which is a time duration in which a communication is established and a sleep duration which is a time duration in which no communication is established. The superframe includes an active duration which is a time duration in which a communication is established, and a sleep duration which is a time duration in which no communication is established. The active duration includes a beacon block in which a plurality of beacon transmission nodes are respectively allocated beacon slots for transmitting a beacon frame, and a forwarding block in which each of sinks nodes is allocated a slot for unifying data regarding the sink node and data regarding sensor nodes managed by the sink node and transmit the result of unifying in order to establish a communication between the sink nodes and between each of the sink nodes and a base station.

According to another aspect of the present invention, there is provided a reliability-based, real-time sensor network multiple access channel (MAC) communication method using a superframe. The superframe includes an active duration which is a time duration in which a communication is established, and a sleep duration which is a time duration in which no communication is established. The active duration includes a beacon block in which a plurality of beacon transmission nodes are respectively allocated beacon slots for transmitting a beacon frame, and a forwarding block in which each of sinks nodes is allocated a slot for unifying data regarding the sink node and data regarding sensor nodes managed by the sink node and transmit the result of unifying in order to establish a communication between the sink nodes and between each of the sink nodes and a base station.

MODE FOR INVENTION

Hereinafter, exemplary embodiments of the present invention will be described in greater detail with reference to the accompanying drawings. Like reference numerals denote like elements throughout the drawings.

In the following description, well-known functions or constructions are not described in detail if it is determined that they would obscure the invention due to unnecessary detail.

For better understanding of the present invention, it will be understood by those skilled in the art that various changes in form and details may be made without departing from the spirit and scope of the invention as defined by the appended claims.

Figure 1:
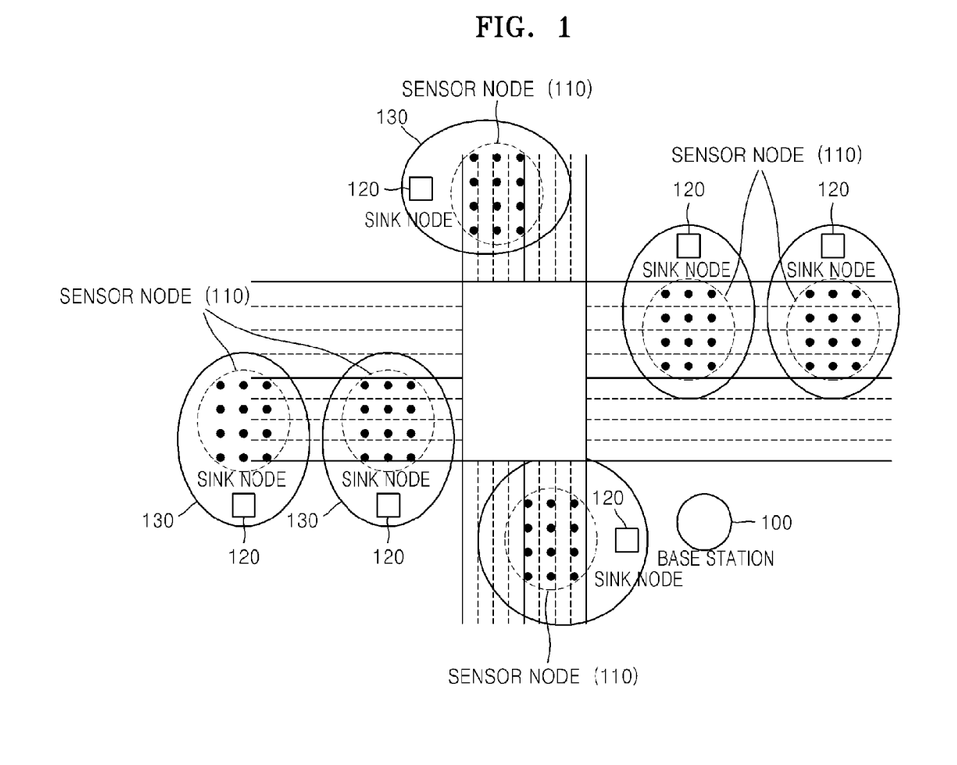
FIG. 1 illustrates an example of a real-time service supporting safe driving as an application of a telematics service required reliability in real time according to an embodiment of the present invention.

Terms used in the present specification are defined as follows:
  base station (BS)—a sensor network node similar to a protected area network (PAN) coordinator defined in a wireless personal area network (WPAN), which is included in a system according to an embodiment of the present invention in order to operate and manage the whole medium access control (MAC) system
  sink node—a sensor network node similar to a coordinator defined in the WPAN, which is included in a system according to an embodiment of the present invention for data forwarding and managing of a sensor node
  sensor node—a sensor network node similar to an end-device defined in the WPAN, which is included in a system according to an embodiment of the present invention order to generate sensing information and transmit it to an upper node FIG. 1 illustrates an example of a real-time service supporting safe driving as an application of a telematics service required reliability in real time according to an embodiment of the present invention. The supporting service is a system that supports safety of drivers and pedestrians by obtaining traffic information on each cross street and determining a current traffic status in real time.

In each cross street, one T-base station 100 is installed at the center or a side of the cross street, and m node clusters each including one T-sink node 120 and n T-sensor nodes 110 are installed in each access road.

A cluster 130 of the T-sensor nodes 110 are embedded in the center of each street in order to transmit information regarding whether there are vehicles to the T-sink node 120 by using a magnetic sensor. The T-base station 100 manages the whole network, and the T-sink node 120 manages each of the clusters 130.

The present invention relates to a sensor network MAC communication system for the telematics service required to be performed in real time and with high reliability in order to establish a radio communication among a T-sensor node, a T-sink node and a T-base station.

Figure 2:
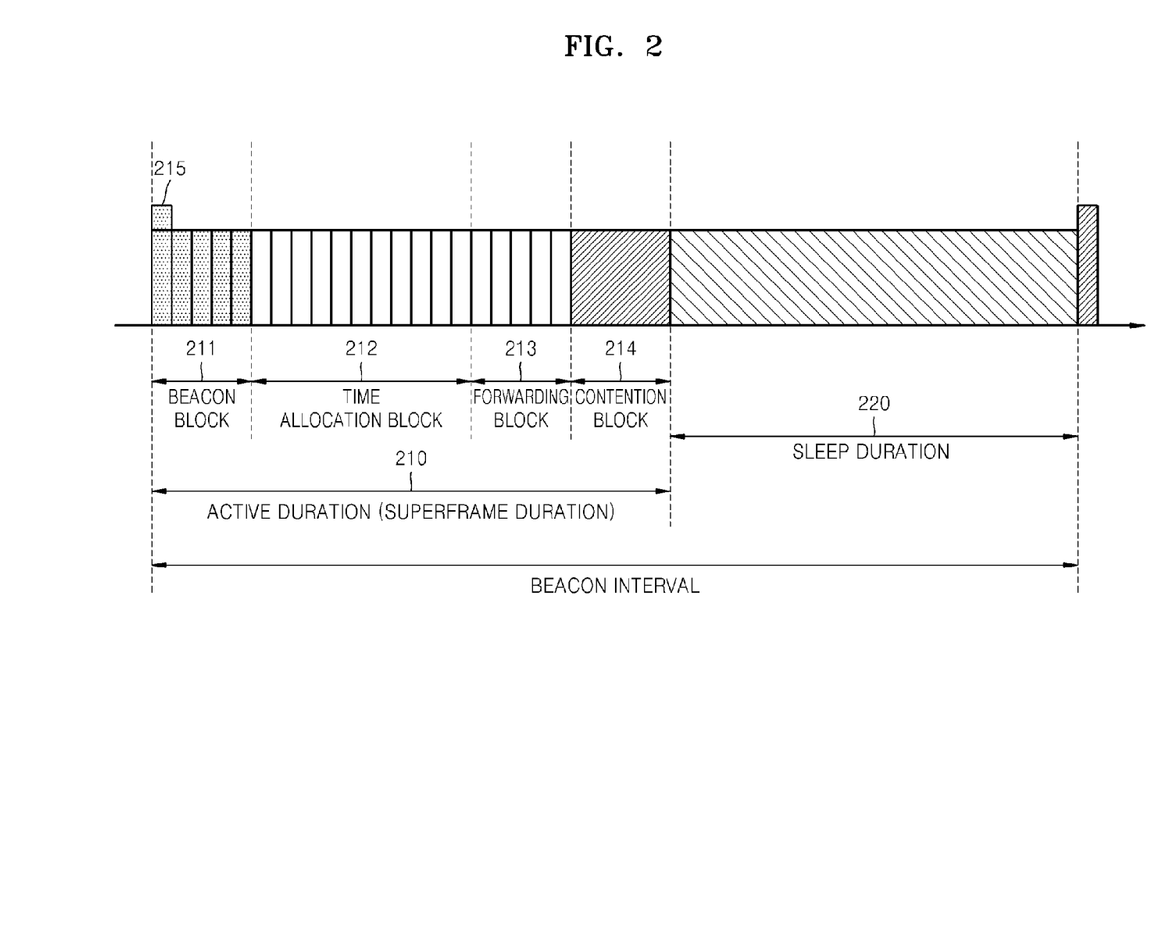
FIG. 2 illustrates the construction of a superframe available for a sensor network MAC communication system for the telematics service required reliability in real time according to an embodiment of the present invention.

FIG. 2 illustrates the construction of a superframe available for a sensor network MAC communication system for the telematics service required reliability in real time according to an embodiment of the present invention. According to the present application, a superframe is newly designed to save power consumption by reflecting the characteristics of a multi-hop node.

The superframe contains information for allocating a time slot for data transmission in units of nodes in order to establish a communication between nodes during MAC employing multi-hop based time division multiple access (TDMA).

The superframe is defined by a PAN coordinator node constituting a network. In an embodiment of the present invention, the superframe is largely divided into an active duration 210 in which a communication is established and a sleep duration 220 in which no communication is established in order to effectively reduce energy consumption of each node. The sleep duration 220 is a time interval for maintaining a power saving mode in all nodes of a system and can be constructed using time slots of the superframe.

The superframe includes a plurality of slots as basic units and/or a plurality of blocks, wherein a block is a unit consisted of at least one slot. The active duration 210 includes a beacon block 211, a time allocation block 212, a forwarding block 213, and a contention block 214.

In the active duration 210, a communication is established in the beacon block 211, the time allocation block 212 and the forwarding block 213 based on a TDMA method, and a communication is established in the contention duration 214 based on the carrier sense multiple access/collision avoidance (CSMA-CA) method.

The beacon block 211 is comprised of a plurality of beacon slots, and respectively allocates time slots to a plurality of beacon transmission nodes so that each of the beacon transmission nodes can exclusively transmit a beacon frame thereof. Thus, each of the beacon transmission nodes can transmit a beacon frame in a time slot allocated to itself.

Figure 3:
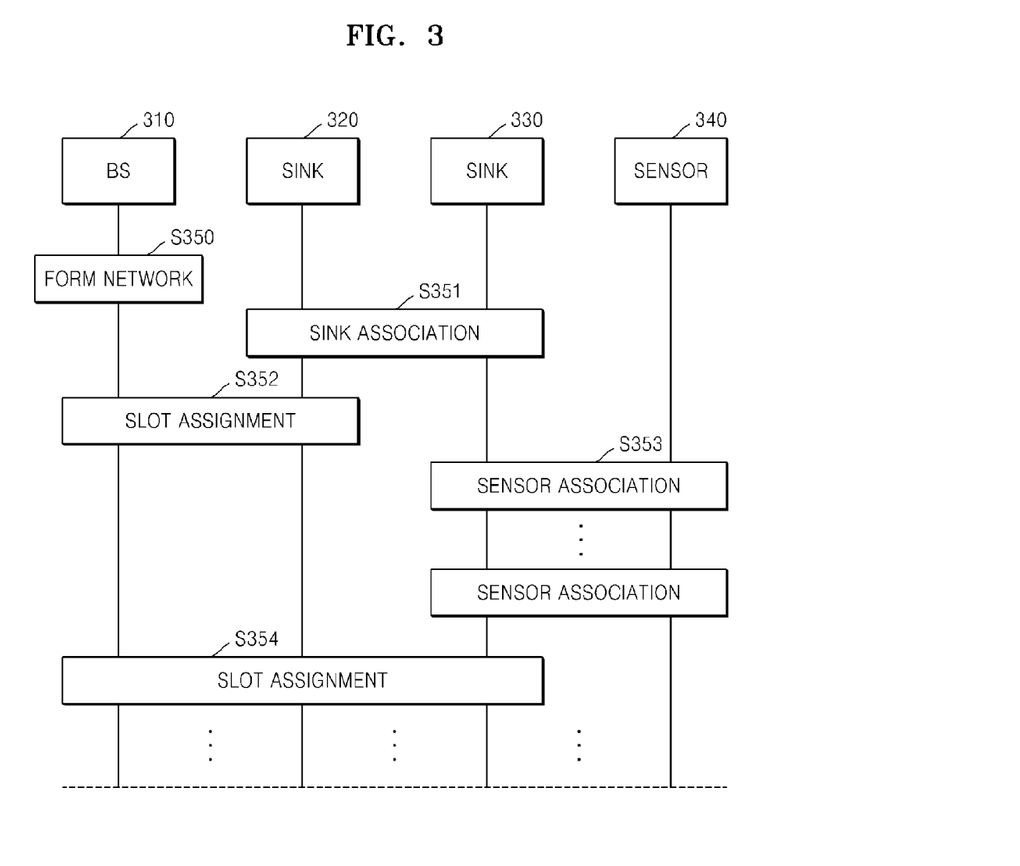
FIG. 3 illustrates an initial process of the service illustrated in FIG. 1 according to an embodiment of the present invention.

If a base station 310 illustrated in FIG. 3 first transmits a beacon frame, the neighboring nodes receiving the beacon frame are synchronized all together with the time receiving the beacon frame, which is used as a reference for superframe timing.

In this case, since the beacon frame contains an information value constituting the superframe, all the nodes receiving the beacon frame can recognize the construction of the superframe, and the other nodes excluding the neighboring nodes can recognize a starting time of the base station 310 by using a superframe structure information field of a beacon field of an upper node thereof. In this way, it is possible to temporarily synchronize all nodes or multi-hops with one another.

Also, the beacon block 211 is a time duration in which the PAN coordinator and a coordinator transmit a beacon frame. Since a network is first formed using a beacon frame as a reference signal for temporally synchronizing all nodes with one another a first beacon 215 must be always a beacon of the PAN coordinator that is a base station managing the whole network. The order and allocation of beacons of the other coordinators are defined in a beacon payload of the PAN coordinator.

The time allocation block 212 is a time duration in which a coordinator is assigned a time slot in order to transmit uplink data of a sensor node that is a lowest node of the system. In other words, the time allocation block 212 is a time duration in which sensor nodes transmit data thereof.

In the case of the service illustrated in FIG. 1, the sensor nodes 110 transmit data to the sink nodes 120 present in the cluster 130. In this case, each of the sensor nodes 110 transmits its data within the time slot assigned by the sink node 120. Information regarding time assignment of the sensor nodes 110 is defined in the slot allocation information field 423 in the beacon frame illustrated in FIG. 4.

The forwarding block 213 is a part of intervals assigning at least one time slots for transmitting the data of the sink node 120 and the data of the sensor nodes 110 managed by the sink node 120 to an adjacent sink node 120 and the base station 100.

The forwarding block 213 is designed to perform data clustering. If there are a large number of sensor nodes, it is difficult to collect data within a given time according to a conventional TDMA method. Thus, the forwarding block 213 enables the sink node 120 to collect data and transmit it at a time, thereby guaranteeing a real-time manner.

FIG. 3 illustrates an initial process of the service illustrated in FIG. 1 according to an embodiment of the present invention.

Here, the initial process is performed before a network operates normally, in which all nodes form a network by obtaining information regarding the structures of neighboring nodes and are assigned time slots for exchanging data in order to provide a specific service. An initial process for each node will now be described.

In order to form a network, the base station 310 first performs an initial process by performing a scanning operation of detecting a sensor network present around nodes (operation S350). A new PAN is generated in a null channel based on the result of performing the scanning operation. In an initial stage, the base station 310 periodically transmits a beacon frame containing an information value for forming a superframe to all nodes present within a range of allowing a radio communication.

Then, if new sink nodes 320 and 330 request access to the base station 310 in order to joint the network (operation S351), the base station 310 forms a superframe by determining a sink node beacon block for the sink nodes 320 and 330 and a forwarding block for forwarding (operation S352). The base station 310 then transmits a command frame to the sink nodes 320 and 330 in order to inform that they satisfactorily join the network.

When a plurality of sensor nodes 340 requests access to the sink node 330 (operation S353), the sink node 330 stands by for a predetermined amount of time and then requests the base station 310 to provide information regarding the sensor nodes 340.

Figure 4:
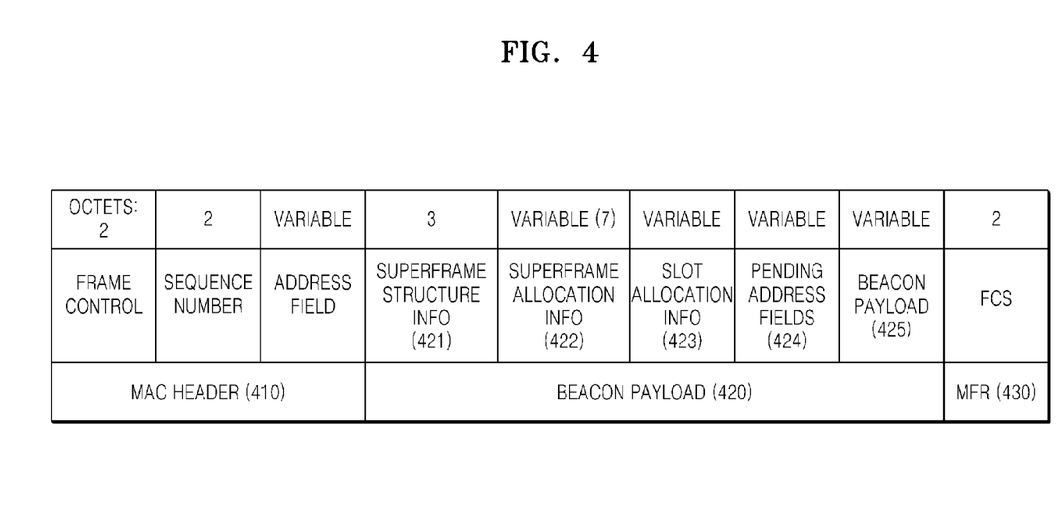
FIG. 4 illustrates the construction of a beacon frame for managing information regarding the superframe of FIG. 2, according to an embodiment of the present invention.

Considering said circumstances, the base station 310 transmits a beacon frame as illustrated in FIG. 4 after forming a superframe. Each of the sink nodes 320 and 330 receiving beacon information containing information regarding the superframe construction from the beacon frame, inserts information regarding communication time slots allocated thereto into the beacon frame and then transmits the beacon frame to the sensor node 340.

Each of the sensor nodes 340 receiving the beacon frame can recognize the superframe construction based on a beacon information value contained in the beacon frame, and detect a time when it can receive the beacon frame and a time when it can transmit data. After initial processes of all the nodes are completed in this way, then transmission of data can start in order to provide the service illustrated in FIG. 1.

FIG. 4 illustrates the construction of a beacon frame for managing information regarding the superframe of FIG. 2, according to an embodiment of the present invention.

The beacon frame is largely divided into an MAC header 410, a beacon payload 420, and an MAC footer (MFR) 430.

The MAC header 410 provides information regarding the structure of a general MAC frame header.

The beacon payload 420 includes a superframe structure information field 421, a superframe allocation information field 422, a slot allocation information field 423, a pending address field 424, and a beacon payload 425.

Figure 5:
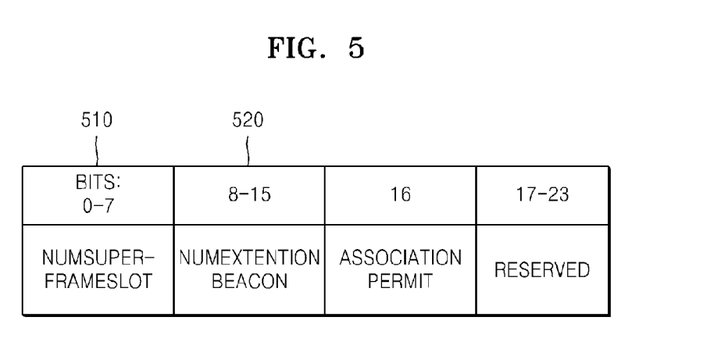
FIG. 5 illustrates the construction of a superframe structure information field of FIG. 4 according to an embodiment of the present invention.

The superframe structure information field 421 indicates the construction of the superframe, and a structure thereof is illustrated in detail in FIG. 5. The superframe allocation information field 422 indicates information regarding blocks included in the superframe, and a structure thereof is illustrated in detail in FIG. 6. The slot allocation information field 423 includes information regarding allocation of slots to sensor nodes, and a structure thereof is illustrated in detail in FIG. 7.

The pending address field 424 indicates information regarding a node that transmits data, for indirect data transmission in which data including the addresses of nodes that are to receive information is transmitted to neighboring nodes according to the IEEE802.15.4 MAC standards, so that a neighboring node can request transmission of the data when its address is included.

FIG. 5 illustrates the construction of the superframe structure information field 421 of FIG. 4, according to an embodiment of the present invention. The superframe structure information field 421 includes a NumSuprerframeSlot value 510 and a NumExtentionBeacon value 520. The NumSuprerframeSlot value 510 indicates the total number of slots constituting the active duration 210 illustrated in FIG. 2, and the NumExtentionBeacon value 520 indicates a sleep duration.

The ranges and definitions of the NumSuprerframeSlot value 510 and the NumExtentionBeacon value 520 are as follows:

1. NumSuprerframeSlot 510: n, total number of slots included in the SuperframeDuration duration 210 of FIG. 2

Figure 6:
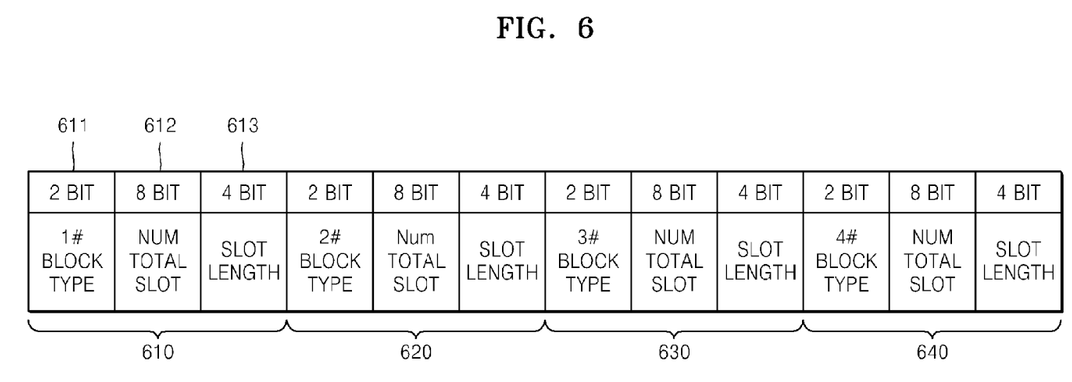
FIG. 6 illustrates the construction of a superframe allocation information field of FIG. 4 according to an embodiment of the present invention.

2. NumExtentionBeacon 520: m, value for determining intervals of time when a series of beacon frames are transmitted SuperframeDuration=number of SuprerframeSlots
BI (Beacon Interval)=(SuperframeDuration X NumExtentionBeacon)
$10 \leq n \leq 256$
$1 \leq m \leq 256$ FIG. 6 illustrates the construction of the superframe allocation information field 422 of FIG. 4, according to an embodiment of the present invention.

A superframe is expressed with a total of four blocks 610, 620, 630, and 640. Each of the blocks 610, 620, 630, and 640 includes a subfield 611 indicating block type, a subfield 612 indicating the total number of slots allocated to each block, and a subfield 613 indicating the length of one slot.

Figure 7:
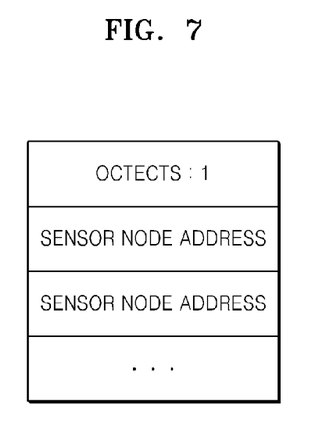
FIG. 7 illustrates the construction of a slot allocation information field of FIG. 4 according to an embodiment of the present invention.

FIG. 7 illustrates the construction of the slot allocation information field 423 of FIG. 4, according to an embodiment of the present invention. Slot allocation information field 423 describes the address information of sensor nodes in the order of slots assigned to the addresses of the sensor nodes.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as computer readable code in the distributed system.

While this invention has been particularly shown and described with reference to exemplary embodiments thereof, it will be understood by those skilled in the art that various changes in form and details may be made therein without departing from the spirit and scope of the invention as defined by the appended claims.

The invention claimed is:

1. A reliability-based, real-time sensor network MAC (medium access control) communication system using a superframe, wherein the superframe comprises:
   an active duration which is a time duration in which a communication is established; and
   a sleep duration which is a time duration in which no communication is established, wherein the active duration comprises:
   a beacon block assigning each of a plurality of beacon transmission nodes to beacon slots in which beacon frame can be transmitted; and
   a forwarding block in which each of sinks nodes is allocated a slot for unifying data regarding the sink node and data regarding sensor nodes managed by the sink node and transmitting the result of the unified data in order to establish a communication between the sink nodes and between each of the sink nodes and a base station,
   wherein the forwarding block is transmitted based on a time division multiple access (TDMA) method.

2. The system of claim 1, wherein a communication is established in the beacon block and the forwarding block according to time division multiple access (TDMA) method.

3. The system of claim 1, wherein the beacon block comprises a plurality of beacon slots, where a first beacon slot from among the beacon slots is allocated a beacon frame of a protected access network (PAN) coordinator which is a base station managing the overall network.

4. The system of claim 1, wherein the superframe is defined by a protected access network (PAN) coordinator which is a base station managing the overall network.

5. The system of claim 1, wherein the beacon frame comprises component information of the superframe, where the component information comprises reference time information for temporally synchronizing the beacon transmission nodes with one another.

6. The system of claim 5, wherein the component information of the superframe comprises information regarding the construction of the superframe, information regarding blocks included in the superframe, and information regarding allocation of slots to the sensor nodes.

7. The system of claim 1, wherein the superframe further comprises a time allocation block in which time slots are allocated to the sink nodes in order to transmit uplink data of the sensor nodes.

* * * * *